May 25, 1926.
G. A. BOBRICK
1,586,398
LIQUID DISPENSER
Filed July 20, 1920
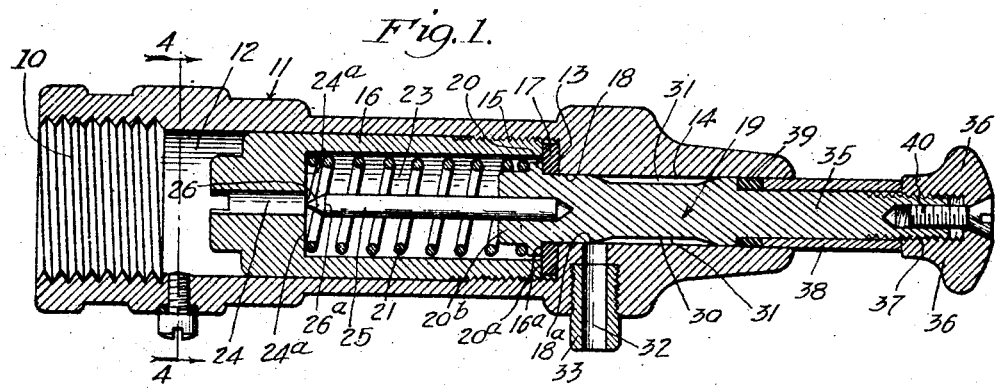
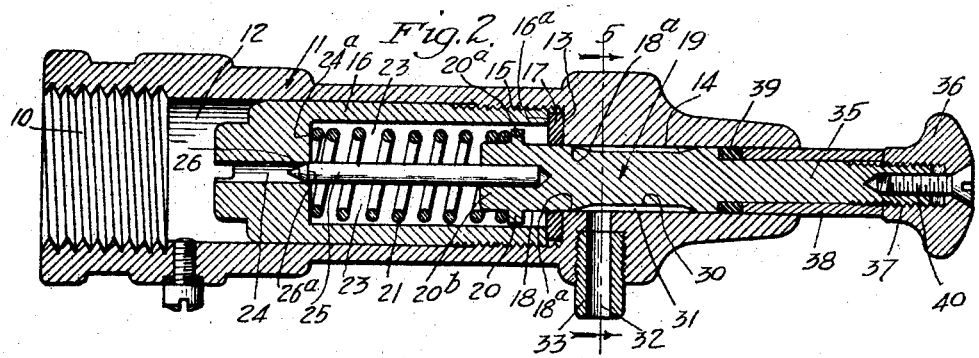
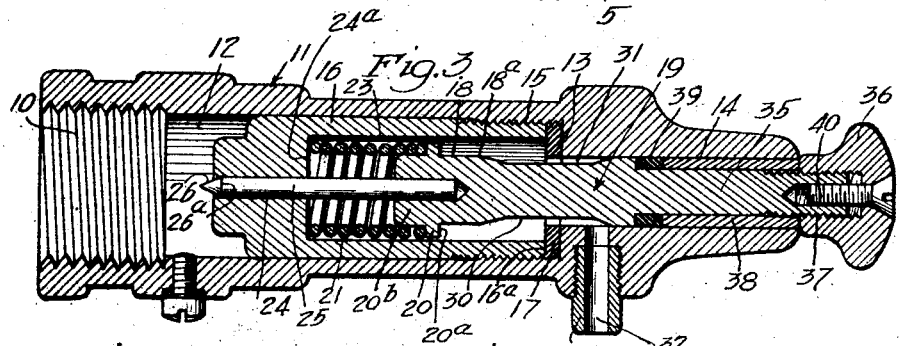
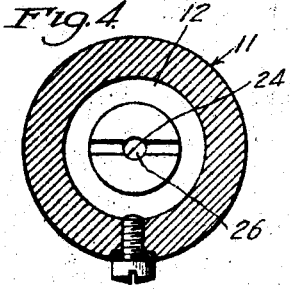
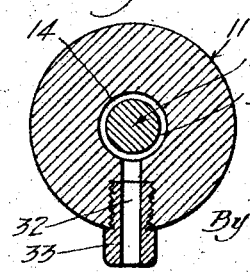
Inventor:
Gabriel A. Bobrick.
By
his Attorney Patented May 25, 1926.

1,586,398

UNITED STATES PATENT OFFICE.

GABRIEL A. BOBRICK, OF LOS ANGELES, CALIFORNIA; MARY E. BOBRICK SPECIAL ADMINISTRATRIX OF SAID GABRIEL A. BOBRICK, DECEASED.

LIQUID DISPENSER.

Application filed July 20, 1920. Serial No. 397,693.

This invention relates generally to liquid dispensers; and although I describe my invention particularly as applied to the dispensing of liquid soap, it will be understood that the invention is not necessarily limited to that particular work, although in its preferred details the present invention has been worked out and perfected with that particular service in view.

The present invention also relates to further improvements in the general type of liquid dispenser shown in my previous Letters Patents and applications. In my prior patent entitled "Liquid soap dispenser", No. 1,158,166, issued to me on October 26, 1915, I describe and claim a form of apparatus adapted to dispense a liquid in measured quantities, and adapted to prevent constant flow of the liquid, regardless of the position in which the device may be held by the user. In this form of my device the valvular means are operated positively, rather than by spring action, etc. In my application Serial No. 78,814, filed Feb. 17, 1916, I described another specific form of liquid dispenser in which the valvular means are actuated by springs, by the liquid pressure, or by gravity; and in my application Ser. No. 318,186, filed Aug. 18, 1919, I again set out, describe and claim a form of dispenser in which the valvular means are positively operated. The form of this last mentioned prior application is, in its general characteristics, similar to the device of the present application; and the broader claims which may cover both of these devices are to be left in said prior application, while the present application will contain the claims which, generally speaking, are more peculiar to the present particular form of the device.

The general object of the present invention is in a dispensing device adapted to dispense measured quantities of liquids, and adapted to prevent any continuous flow of that liquid; to provide such a device in a simple, easily and inexpensively manufactured form, effective in operation, and free from leakage. Other more specific objects, and corresponding advantages of the present invention, will be best understood from the following detailed description of my now preferred specific form of device embodying the invention; but it will be understood that I do not give this specific and detailed description primarily for the purpose of limiting my invention to such details, but for the purpose of enabling a clear and accurate understanding of my invention to be had, as well in its broad aspects as in its more specific aspects.

For the purpose of such detailed and specific description of a preferred form, I now refer to the accompanying drawings in which—

Fig. 1 is an enlarged central longitudinal section of my device in its normal position; Fig. 2 is a similar section showing the device actuated to an intermediate position; Fig. 3 is a similar section showing the device in its limiting position of actuation; Fig. 4 is a cross-section taken on line 4—4 of Fig. 1; and Fig. 5 is a cross-section taken on line 5—5 of Fig. 2.

It is understood in the art as practiced by me, and as set forth in my said Letters Patents, that such a liquid dispenser as I herein illustrate and describe may be used in connection with any kind of gravity or pressure feed system, and either with an individual reservoir or supply for each dispensing apparatus, or with a common reservoir of supply for a number of such apparatus. Consequently, it is not necessary here to describe in detail any supply system or means it being sufficient for a description and understanding of the present invention to simply understand that the liquid is supplied under gravity or other pressure through a pipe or tube or the like which is screwed into the open screw-threaded end 10 of the body 11 of my device.

The body 11 of my present form of device is preferably made without any joints and without any projections or recesses, corners, etc., in which dirt, grease, or soap suds may be caught and held. The body may be made preferably integrally of one piece and may be either machined out of a solid bar of metal or may be cast and machined as necessary. It is preferably smoothly finished externally. It is a feature of my present construction that the body carries no parts that are put on or into the body from its forward end; the parts, and notably the displacement chamber member, being inserted in place from the rear end of the body in such a manner that they cannot be removed or loosened without first removing the whole device from its supply pipe.

The body has a large bore 12 extending forwardly from its rear end and ending at a rearwardly facing shoulder 13; and from this shoulder 13 a smaller bore 14 extends on to the front end of the body. At the forward end of the larger bore 12, screw-threads are provided at 15; and the forward open end of a displacement chamber member 16 is screw-threaded into the screw-thread 15. The forward end of member 16 is screwed down tightly upon a washer 17 which is composed of some suitable yielding material, such as leather. This washer is made to fit as tightly as practicable (without causing undue friction) around the cylindrical part 18 of plunger 19, when the parts are in the position shown in Fig. 1. The cylindrical part 18 constitutes a part of the valvular head of the plunger, which head also includes the flange 20 that also co-operates with washer 17 to perform valvular function. When the parts are in this position, the flange 20 on or near the end of plunger 19 is pressed forwardly against the washer 17 by the spring 21, which spring bears against the shoulder 24ª at the rear end of the displacement chamber 23 and bears against the flange 20 of the plunger 19. This spring is of sufficient strength to press the flange 20 firmly against washer 17 to make a liquid tight joint. The specific function of flange 20 is to seal the device against leakage when in normal position. Spring 21 is mounted tightly on hub 20ᵇ which is of sufficient length to hold the spring in proper central position and prevent it rubbing against the wall of member 16.

Admission to displacement chamber 23 is provided by a port 24, which is preferably a cylindrical bore and is adapted to be closed by a cylindrical valve pin 25 which is pointed at 26 to facilitate its entry into the port 24. In normal position of the device the port 24 is open, but is closed by the valve pin 25 when the device is moved, as will be hereinafter described. Valve pin 25 is mounted in the rear end of plunger 19, and the distance between the valve seat surface of head 20 and the end of valve pin 25 is so related to the length of member 16 and the length of chamber 23, as to cause the specific operations as hereinafter set forth.

The plunger 19 has a reduced portion adjacent cylindrical portion 18 as indicated at 30, so that an annular space is left at 31 around that part of the plunger that is normally within the bore 14. When in the position shown in Fig. 1, this annular space does not communicate at all with the displacement chamber 23, nor does it communicate with the displacement cylinder at any time while the port 24 is open; only communicating with that measuring chamber when the device has moved to such a position as shown in Fig. 3. When in the position shown in Fig. 3 this annular space also communicates with the discharge nozzle opening 32. This nozzle opening may preferably be provided through a nozzle 33 formed as a separate piece and forced tightly or screw-threaded into the body 11.

Projecting forwardly from plunger 19 there is a plunger stem 35 which carries a suitable push button 36 at its forward end, the push button being of such shape as to be adapted to be pushed against by the palm or heel of the hand. The push button 36 is preferably screw-threaded at 37 onto the forward end of stem 35; and rearwardly of the push button and around the stem there lies a sleeve 38 whose rear bears against an annular packing 39. This annular packing may be of any suitable material, preferably of asbestos twine. By screwing push button 36 onto stem 35, it will be seen that the annular packing 39 will be readily compressed longitudinally and will thus be expanded radially to press with sufficient force against the wall of bore 13 and around stem 35. By this means the plunger may be packed tight in bore 14 and no leakage of liquid can occur at this point. When the packing is set at the proper compression, the push button 36 may be set in position by the set screw 40 which extends through push button 36 and screws into stem 35; sufficient spaces being provided to allow of tightening adjustment.

When the device is in the position shown in Fig. 1, with valve head 20 pressed forwardly against washer 17, no liquid can reach the discharge nozzle 33, because of the effectively tight joint between the valve head flange 20 and the washer. When the plunger is moved rearwardly toward the position shown in Fig. 2, the washer 17, and the fit of part 18 in bore 14, prevent any substantial flow or leakage of liquid to the nozzle, because they fit the cylindrical part 18 of the plunger sufficiently tightly to prevent such flow or leakage. The relation of the parts is such that, when the device reaches the position shown in Fig. 2, with the cylindrical part 18 still engaging washer 17, and also preferably still engaging in the smaller bore 14, but just about to leave engagement with this washer and with the smaller bore, the end 26 of valve pin 25 has just fully entered the port 24 and has just cut off communication of the supply with measuring chamber 23. The length of the cylindrical part 18 is greater than the distance from port 24 to the cylindrical part of the pin at 26ª. A further comparatively slight movement rearwardly of the parts then carries the annular space 31 rearwardly into direct communication with chamber 23; and then, during further rearward movement of the parts, this annular space 31 remains in communication with displacement chamber 23 and also with nozzle passage 32, and the valve pin 25 continues to keep port 24 closed. Consequently, during this further rearward movement from after the time that space 31 has come into communication with displacement chamber 23, the liquid in the chamber 23 is forced out through nozzle opening 32 by an amount which depends upon the displacement in the chamber caused by the entry of plunger 19 thereto. This amount may of course be initially regulated by proper proportioning of the sizes of the plunger and of chamber 23, and the length of stroke of the plunger after communication of space 31 with the displacement chamber. A predetermined quantity of liquid is thus discharged through the nozzle upon each inward stroke of the plunger.

Now it will be seen that the co-operative action of the two valvular means herein described is determined by the relation of (1) the distance between the shoulder at 24$^a$ and the rear end 16$^a$ of member 16 (in other words, the length of chamber 23); (2) the distance between the point 26$^a$ at the end of valve pin 25 and the forward valve seat surface 20$^a$ of the valve head or flange 20; and (3) the distance between the point 26$^a$ and the point 18$^a$ at the rear end of the cylindrical part 18 of plunger 19. It is readily seen, without the necessity of further detailed description, that these distances determine the relative positions at which the valve head 20 seats on washer 17, at which the end 26 of the valve pin 25 closes port 24, and at which communication is established between space 31 and displacement chamber 23. It will also be seen that the thickness of washer 17 has nothing whatever to do with the co-operative action of the three valvular means. It may also be here further explained that the primary functions of the displacement chamber member 16 are, first, to hold the washer 17 in position when the plunger is in motion, and, second, to make the distance between the inner face 16$^a$ of washer 17 and face 24$^a$, of the displacement chamber, exactly the same as the distance from the face 20$^a$ of the valve to the end of pin 25, regardless of the thickness of the washer 17. Such being the case, it is comparatively easy to so manufacture the device that these controlling distances have proper relations to each other; and the parts having been once properly made to size, the assembly cannot be made in anything but the correct manner.

In the movement of the device from the position shown in Fig. 2, through a distance sufficient to carry the point 18$^a$ rearwardly to the rear face (the left hand face in the drawings) of washer 17, there must of course be a sufficient allowance, by leakage, or by compressibility of the liquid, or both, to permit this movement. Of course it will be understood that this is necessary only while the plunger is in motion; as soon as it comes to rest the whole device is tightly sealed, and I prefer to make the device as liquid tight as possible at all times. Under the pressure generated by the movement of the plunger by hand, and by the momentum acquired in the previous part of the movement, the liquids in the device are compressed to allow movement on from the position shown in Fig. 2. As soon as the valve pin 25 is entered fully into port 24, then passage of liquid through that port is completely stopped; and as the plunger is moved rearwardly, to the position shown in Fig. 3, the liquid can only pass out through the opening 32.

At the end of the return stroke, as soon as the device reaches again the position shown in Fig. 2 and passes forward of this position, then the liquid again runs into the displacement chamber 23 to fill it ready for the next operation. The plunger in its outward stroke has created a vacuum in advance of the flow of liquid.

It will be seen that the form of device which I herein describe is very simple in its construction and can be very easily and inexpensively manufactured and assembled, and also that it is effective in its operation. It is subject to no leakage, and can not be so operated as to allow a continuous flow or leakage of liquid. Its parts which must be accurately dimensioned in order to cause proper operation, are parts which are easily made accurate in size; and it has been shown that the assembly of the parts can not in any manner change the accuracy of those relations. There are no exposed parts that can be accidentally, or even mischievously, removed or loosened by a user; the only exposed part that can be loosened is the push button; and, while it is held on with a set screw and therefore difficult to loosen without the use of a tool, yet even if it is loosened it does not put the device out of operation.

Having described a preferred form of my invention, I claim:—

1. In a liquid dispenser, a body having a rear end opening adapted to be connected to a feed pipe or the like, a large bore extending forwardly from the opening, a smaller bore extending to the forward end of the body from the large bore, a member fitting the large bore and insertible in it from its rear end and having an inlet port therethrough and forming at its forward side a displacement chamber extending rearwardly of the forward end of the large bore, a plunger having an enlargement on its rear end and fitting in and extending forwardly through the smaller bore with the enlargement in the displacement chamber, said enlarged end constituting valvular means adapted to close exit from the forward end of the chamber; and valvular means carried by the plunger to close the said inlet port.

2. In a liquid dispenser, a body having a rear end opening adapted to be connected to a feed pipe or the like, a large bore extending forwardly from the opening, a smaller bore extending to the forward end of the body from the large bore, a member fitting the large bore and insertable in it from its rear end and having an inlet port therethrough and forming at its forward side a displacement chamber extending rearwardly of the forward end of the large bore, a plunger having an enlargement on its rear end and fitting in and extending forwardly through the smaller bore with the enlargement in the displacement chamber, said enlarged end constituting valvular means adapted to close exit from the forward end of the chamber; the said port comprising a longitudinal bore through said member; and a valve pin carried by the plunger and adapted to pass into said port.

3. In a liquid dispenser, a hollow body, a movable plunger extending within the body, an oulet from the body, valvular means comprising a valve head on the plunger and moving therewith to close the outlet when the plunger is at one end of its stroke, a displacement chamber member within the body and said member having an inlet port leading to its contained displacement chamber, and valvular means for closing said port when the plunger is moved toward the other end of its stroke embodying a valve member carried by and moving with the plunger.

4. In a liquid dispenser, a hollow body, a movable plunger extending within the body, an outlet from the body, valvular means comprising a valve head on the plunger and moving therewith to close the outlet when the plunger is at one end of its stroke, a displacement chamber member within the body and said member having an inlet port leading to its contained displacement chamber, and valvular means for closing said port when the plunger is moved toward the other end of the stroke embodying a valve member carried by and moving with the plunger; the valve head and the said valve member being in fixed definite relation to each other on the plunger so that the opening of the first mentioned valvular means and the closing of the second mentioned valvular means occur in fixed definite relation to each other.

5. In a liquid dispenser, a hollow body, a movable plunger extending within the body, an outlet from the body, valvular means comprising a valve head on the plunger and moving therewith to close the outlet when the plunger is at one end of its stroke, a displacement chamber member within the body and said member having an inlet port leading to its contained displacement chamber, and valvular means for closing said port when the plunger is moved toward the other end of the stroke embodying a valve member carried by and moving with the plunger; the first mentioned valvular means embodying also a valve seat washer within the body and held in place therein by the end of the displacement chamber member; the valve head and the said valve member being in definite relation to each other and also a distance apart from each other that bears a definite relation to the distance between the washer holding end of the displacement chamber member and its inlet port, so that the opening of the first mentioned valvular means and the closing of the second mentioned valvular means occur in fixed definite relation to each other.

6. In a liquid dispenser, a hollow body having two longitudinal intercommunicating bores one large and one small, with a shoulder at the end of the larger bore, a plunger reciprocable in the smaller bore and having a head which projects into the larger bore, a valve washer in the larger bore seated against its shoulder and normally engaged by the valve head when the plunger is at one end of its stroke, a displacement chamber member comprising a member fitting in the larger bore and having an open end bearing against the washer to hold it in place and having at its opposite end an inlet port to its chamber; and a valve member carried by the plunger and adapted to enter and close the said port when the plunger is moved from its normal position.

7. In a liquid dispenser, a hollow body having two longitudinal intercommunicating bores one large and one small, with a shoulder at the end of the larger bore, a plunger reciprocable in the smaller bore and having a head which projects into the larger bore, a valve washer in the larger bore seated against its shoulder and normally engaged by the valve head when the plunger is at one end of its stroke, a displacement chamber member comprising a member fitting in the larger bore and having an open end bearing against the washer to hold it in place and having at its opposite end an inlet port to its chamber; and a valve member carried by the plunger and adapted to enter and close the said port when the plunger is moved from its normal position; the valve member and the valve head of the plunger being so related in position and their distance apart being so related to the length of the chamber member between its washer engaging end and its inlet port, that the valve member enters and substantially closes the inlet port just before the plunger head in its movement leaves engagement with the washer.

8. In a liquid dispenser, a hollow body having two longitudinal intercommunicating bores one large and one small, with a shoulder at the end of the larger bore, a plunger reciprocable in the smaller bore and having a head which projects into the larger bore, a valve washer in the larger bore seated against its shoulder and normally engaged by the valve head when the plunger is at one end of its stroke, a displacement chamber member comprising a member fitting in the larger bore and having an open end bearing against the washer to hold it in place and having at its opposite end an inlet port to its chamber; the plunger head embodying a cylindrical portion which passes and fits through the washer which is annular, and embodying a flange adjacent one end of the cylindrical portion which flange in the normal position of the plunger bears against the face of the washer, the plunger having a reduced portion adjacent the other end of the cylindrical portion; and a valve pin carried by the plunger and adapted when the plunger is moved from its normal position to enter and close the inlet port to the displacement chamber; the distance between the entering end of the valve pin and the last mentioned end of the cylindrical head portion being so related to the length of the chamber member between its inlet port and its washer engaging end that the valve pin enters and substantially closes the port not later than the time the cylindrical head portion in the movement of the plunger leaves engagement with the washer.

9. In a liquid dispenser, a hollow body having two longitudinal intercommunicating bores one large and one small, with a shoulder at the end of the larger bore, a plunger reciprocable in the smaller bore and having a head which projects into the larger bore, a valve washer in the larger bore seated against its shoulder and normally engaged by the valve head when the plunger is at one end of its stroke, a displacement chamber member comprising a member fitting in the larger bore and having an open end bearing against the washer to hold it in place and having at its opposite end an inlet port to its chamber; the plunger head embodying a cylindrical portion which passes and fits through the washer which is annular, and embodying a flange adjacent one end of the cylindrical portion which flange in the normal position of the plunger bears against the face of the washer, the plunger having a reduced portion adjacent the other end of the cylindrical portion; and a valve pin carried by the plunger and adapted when the plunger is moved from its normal position to enter and close the inlet port to the displacement chamber; the distance between the entering end of the valve pin and the last mentioned end of the cylindrical head portion being so related to the length of the chamber member between its inlet port and its washer engaging end that the valve pin enters and substantially closes the port before the cylindrical head portion in the movement of the plunger leaves engagement with the washer.

10. In a liquid dispenser, a hollow body having two longitudinal intercommunicating bores one large and one small, with a shoulder at the end of the larger bore, a plunger reciprocable in the smaller bore and having a head which projects into the larger bore, a valve washer in the large bore seated against its shoulder and normally engaged by the valve head when the plunger is at one end of its stroke, a displacement chamber member comprising a member fitting in the larger bore and having an open end bearing against the washer to hold it in place and having at its opposite end an inlet port to its chamber; the plunger head embodying a cylindrical portion which passes and fits through the washer which is annular, and embodying a flange adjacent one end of the cylindrical portion which flange in the normal position of the plunger bears against the face of the washer, the plunger having a reduced portion adjacent the other end of the cylindrical portion; and a valve pin carried by the plunger and adapted when the plunger is removed from its normal position to enter and close the inlet port to the displacement chamber; the distance between the entering end of the valve pin and the last mentioned end of the cylindrical head portion being so related to the length of the chamber member between its inlet port and its washer engaging end that the valve pin enters and substantially closes the port not later than the time the cylindrical head portion in the movement of the plunger leaves engagement with the washer; the small bore having an outlet which is in communication with the reduced portion of the plunger; and a packing laid in a groove around the plunger outside the outlet, the plunger projecting beyond the end of the bore and having a handle.

11. In a liquid dispenser, a hollow body having two longitudinal intercommunicating bores one large and one small, with a shoulder at the end of the larger bore, a plunger reciprocable in the smaller bore and having a head which projects into the larger bore, a valve washer in the larger bore seated against its shoulder and normally engaged by the valve head when the plunger is at one end of its stroke, a displacement chamber member comprising a member fitting in the larger bore and having an open end bearing against the washer to hold it in place and having at its opposite end an inlet port to its chamber; the plunger head embodying a cylindrical portion which passes and fits through the washer which is annular, and embodying a flange adjacent one end of the cylindrical portion which flange in the normal position of the plunger bears against the face of the washer, the plunger having a reduced portion adjacent the other end of the cylindrical portion; and a valve pin carried by the plunger and adapted when the plunger is moved from its normal position to enter and close the inlet port to the displacement chamber; the distance between the entering end of the valve pin and the last mentioned end of the cylindrical head portion being so related to the length of the chamber member between its inlet port and its washer engaging end that the valve pin enters and substantially closes the port not later than the time the cylindrical head portion in the movement of the plunger leaves engagement with the washer; the small bore having an outlet which is in communication with the reduced portion of the plunger; and a packing laid in a groove around the plunger outside the outlet, means for longitudinally compressing the packing embodying a sleeve around the plunger, and a handle screw threaded onto the end of the plunger and bearing against the sleeve.

12. In a liquid dispenser a body having longitudinal bores relatively small and large, a plunger extending through the smaller bore into the larger bore, co-acting valvular means between the body and plunger, a displacement chamber member embodying a hollow cylindrical body with one end closed and the other end open, the open end inserted in the larger bore so that the hollow of the member encompasses the plunger, said member having a port in its closed end, and a port closing member carried by the plunger and adapted to close the port when the plunger is moved.

13. In a liquid dispenser, a body having two longitudinal bores one large and one small and a shoulder at the forward end of the larger bore where the smaller bore joins it, a plunger extending rearwardly through the smaller bore and having at its rear end a head which extends into the larger bore, a displacement chamber member embodying a hollow cylindrical body with one end closed and the other open and the member lying in the larger bore with its open end toward the shoulder, co-operating valvular means on the plunger head and the body adjacent the forward end of the large bore, the rear closed end of the chamber member having an inlet port, and a port closing member carried by the plunger.

14. In a liquid dispenser, a body having two longitudinal bores one large and one small and a shoulder at the forward end of the larger bore where the smaller bore joins it, a plunger extending rearwardly through the smaller bore and having at its rear end a head which extends into the larger bore, a displacement chamber member embodying a hollow cylindrical body with one end closed and the other open and the member lying in the larger bore with its open end toward the shoulder, co-operating valvular means on the plunger head and the body adjacent the forward end of the large bore, said means embodying a cylindrical part of the plunger which fits the smaller bore for a certain distance forward of the forward end of the larger bore, the rear closed end of the chamber member having an inlet port, and a port closing member carried by the plunger; the relative placements of the parts being such that the port closing member enters the port at a time not later than that at which the cylindrical part of the plunger leaves engagement with the smaller bore.

15. In a device of the character described, in combination with a body having a bore and a plunger movable therein, means for packing the plunger in the bore embodying a reduced stem portion on the plunger ending at a shoulder, a packing around the stem against the shoulder, a sleeve around the stem and bearing longitudinally against the packing, and a handle mounted on the outer end of the stem and abutting against the sleeve to hold it in adjusted position.

16. In a device of the character described, in combination with a body having a bore and a plunger movable therein, means for packing the plunger in the bore embodying a reduced stem portion on the plunger ending at a shoulder, a packing around the stem against the shoulder, a sleeve around the stem and bearing longitudinally against the packing, a handle screw-threaded on the stem and bearing against the outer end of the sleeve and means to lock said handle on the stem.

17. In a device of the character described, in combination with a body having a bore and a plunger movable therein, means for packing the plunger in the bore embodying a reduced stem portion on the plunger ending at a shoulder, a packing around the stem against the shoulder, a sleeve around the stem and bearing longitudinally against the packing, a handle screw-threaded on the outer end of the stem and bearing against the outer end of the sleeve, and a set screw passing longitudinally through the handle and screwing into the end of the stem to set the sleeve in position so that the handle will not be moved relatively to the stem when the plunger is reciprocated through the medium of the handle.

In witness that I claim the foregoing I have hereunto subscribed my name this 14th day of July, 1920.

GABRIEL A. BOBRICK.